United States Patent
Ephraim et al.

(10) Patent No.: US 9,446,361 B2
(45) Date of Patent: Sep. 20, 2016

(54) METHOD OF DENSIFYING COFFEE

(75) Inventors: Daniel Richard Ephraim, Wilmette, IL (US); Christopher Martin Spatz, Chicago, IL (US)

(73) Assignee: Modern Process Equipment, Inc., Chicago, IL (US)

(*) Notice: Subject to any disclaimer, the term of this patent is extended or adjusted under 35 U.S.C. 154(b) by 821 days.

(21) Appl. No.: 13/545,203

(22) Filed: Jul. 10, 2012

(65) Prior Publication Data

US 2013/0087644 A1   Apr. 11, 2013

Related U.S. Application Data

(60) Provisional application No. 61/545,757, filed on Oct. 11, 2011.

(51) Int. Cl.
| | | |
|---|---|---|
| *A23F 5/08* | (2006.01) | |
| *B01F 7/00* | (2006.01) | |
| *B01F 13/10* | (2006.01) | |
| *B01F 15/00* | (2006.01) | |
| *B01F 15/02* | (2006.01) | |
| *B01F 3/18* | (2006.01) | |
| *A23F 5/28* | (2006.01) | |

(52) U.S. Cl.
CPC ............ *B01F 7/00708* (2013.01); *B01F 3/18* (2013.01); *B01F 7/001* (2013.01); *B01F 7/00141* (2013.01); *B01F 7/00258* (2013.01); *B01F 13/1002* (2013.01); *B01F 13/1047* (2013.01); *B01F 15/00201* (2013.01); *B01F 15/0251* (2013.01); *A23F 5/28* (2013.01); *B01F 2013/1086* (2013.01)

(58) Field of Classification Search
CPC ............... B01F 13/1002; B01F 15/00201; B01F 2013/1086; B01F 7/00258; B01F 7/0078; A23F 5/08; A23F 5/10; A23F 5/12; H02P 29/0033
See application file for complete search history.

(56) References Cited

U.S. PATENT DOCUMENTS

| | | | |
|---|---|---|---|
| 939,392 A | 11/1909 | Chambers, Jr. | |
| 2,118,010 A * | 5/1938 | Hazle, Jr. | ......................... 241/13 |
| 2,323,771 A | 7/1943 | Hazle | |
| 3,304,355 A * | 2/1967 | Pobst, Jr. et al. | ............. 264/117 |
| 3,866,799 A | 2/1975 | Rikker et al. | |
| 4,061,316 A | 12/1977 | Austin | |
| 4,174,074 A | 11/1979 | Geiger | |
| 4,786,001 A * | 11/1988 | Ephraim et al. | ........... 241/101.8 |
| 5,407,138 A | 4/1995 | Graenicher et al. | |
| 5,500,088 A | 3/1996 | Allison et al. | |
| 5,538,053 A | 7/1996 | Derby | |
| 5,783,239 A | 7/1998 | Callens et al. | |
| 5,853,788 A | 12/1998 | Murphy et al. | |

(Continued)

FOREIGN PATENT DOCUMENTS

| | | |
|---|---|---|
| GB | 1104827 A | 2/1968 |
| JP | S562836 A | 1/1981 |
| WO | 2011044941 A1 | 4/2011 |

*Primary Examiner* — Tony G Soohoo
(74) *Attorney, Agent, or Firm* — Erickson Law Group, PC

(57) ABSTRACT

A method of controlling coffee density exiting from a coffee densifier is disclosed. The method includes the steps of feeding a ground coffee into a mixing chamber having a discharge door. A mixer motor load on a mixer motor driving mixing members agitating the ground coffee in the mixing chamber is measured. The discharge door is moved when the mixer motor load is outside a predefined mixer motor load operating range.

33 Claims, 13 Drawing Sheets

(56) References Cited

U.S. PATENT DOCUMENTS

| | | |
|---|---|---|
| 6,109,779 A | 8/2000 | Weinekoetter |
| 6,199,780 B1 | 3/2001 | Gorlitz |
| 6,764,034 B2 | 7/2004 | Kelsey |
| 7,306,820 B2 | 12/2007 | Hoashi et al. |
| 7,694,901 B2 | 4/2010 | Russel-Smith |
| 8,091,813 B2 | 1/2012 | Kirschner et al. |
| 2005/0183581 A1 | 8/2005 | Kirschner et al. |
| 2007/0181005 A1 | 8/2007 | Kirschner et al. |
| 2008/0038441 A1 | 2/2008 | Kirschner |
| 2011/0064865 A1 | 3/2011 | McCurdy et al. |

* cited by examiner

METHOD OF DENSIFYING COFFEE

This application claims the benefit of U.S. Provisional Patent Application Ser. No. 61/545,757, filed on Oct. 11, 2011.

FIELD OF THE INVENTION

The invention relates to systems for processing coffee.

BACKGROUND OF THE INVENTION

Industrial coffee grinders have been well known for a number of years. Coffee grinders frequently comprised one or more coffee grinding sections which may be stacked above a mixer. The mixer, which may comprise a screw conveyor, blends and conveys the coffee through a screw conveyor section to a discharge section.

Industrial coffee grinder mixer assemblies are frequently intended to be used to agitate and blend coffee to an increased bulk density level so that the ground coffee can be fit into a given amount of volume. This might be useful for products such as pods, capsules, and cans with smaller volume metric dimensions than standard. The present inventor recognized that it would be an advantage to provide a grinder mixer machine and method for producing high density coffee which could be adjusted to meet the specific requirements of downstream packaging.

As shown in U.S. Pat. No. 4,786,001, it is known to provide paddles within a coffee mixer, where the paddles extend from a rotatable mixer shaft. The paddles include a paddle arm fixed at one end to the mixing shaft and a paddle member extending perpendicularly from the paddle arm at an end of the paddle arm opposite the mixing shaft so that the paddles are a substantially T-shape.

The present inventor recognized that the paddles of the prior art mixers encounter a limit in the coffee density that can be imparted by the use of paddle mixing without creating excessive heat, which can over roast the coffee. The inventor recognized the paddles of the prior art mixers imparted unnecessary drag on the mixing motor during operation.

The present inventor recognized that, it would be desirable to provide a coffee densifier that produced a higher density coffee with less energy. The present inventor recognized that it would be desirable to provide a coffee densifier that is capable of producing coffee having a coffee density higher than that achievable by prior art paddle mixers.

Further the present inventor has recognized it would be desirable to provide an automatically control system for controlling the resulting coffee density being processed through a coffee densifier so as to maintain a consistent coffee density in the coffee exiting the densifier.

SUMMARY OF THE INVENTION

A method of controlling coffee density exiting from a coffee densifier is disclosed. The method includes feeding a ground coffee into a mixing chamber having a discharge door, measuring a mixer motor load on a mixer motor driving mixing members agitating the ground coffee in the mixing chamber, and moving the discharge door when the mixer motor load is outside a predefined mixer motor load operating range to increase or decrease the denisty of the coffee exiting the mixing chamber.

In some embodiments, the step of moving comprises the step of retracting the discharge door a predefined distance to increase the density of the coffee exiting the mixing chamber when the mixer motor load is below the mixer motor load operating range. In some embodiments, the step of moving comprises the step of opening the discharge door a predefined distance to decrease the density of the coffee exiting the mixing chamber when the mixer motor load is above the mixer motor load operating range.

In some embodiments, the step of positioning the discharge door to a full closed position during mixer startup until the mixer motor load reaches the mixer motor load operating range.

In some embodiments, the step of positioning the discharge door in a full open position after a predetermined time period when no coffee grounds are being added to the mixing chamber.

Another method of controlling coffee density exiting from a coffee densifier is disclosed. The method includes the steps of feeding a ground coffee into a mixing chamber having a discharge door. A mixer motor load on a mixer motor driving mixing members agitating the ground coffee in the mixing chamber is measured. The discharge door is moved when the mixer motor load is outside a predefined mixer motor load operating range.

In some embodiments, the step of moving the discharge door comprises the step of retracting the discharge door a predefined distance to increase the mixer motor load when the mixer motor load is below the mixer motor load operating range. The step of moving the discharge door further comprises the step of opening the discharge door a predefined distance to decrease the mixer motor load when the mixer motor load is above the mixer motor load operating range.

In some embodiments, the step of moving is further defined in that the predefined mixer motor load operating range is a mixer motor load setpoint.

Another method of controlling coffee density exiting from a coffee densifier is disclosed. The method includes feeding a ground coffee into a mixing chamber having a discharge door, measuring a mixer motor load on a mixer motor driving mixing members agitating the ground coffee in the mixing chamber, and moving the discharge door when the mixer motor load is outside a predefined mixer motor load operating range to increase or decrease the mixer motor load.

In some embodiments, the step of moving comprises the step of retracting the discharge door a predefined distance to increase the mixer motor load when the mixer motor load is below the mixer motor load operating range. In some embodiments, the step of moving comprises the step of opening the discharge door a predefined distance to decrease the mixer motor load when the mixer motor load is above the mixer motor load operating range.

Another method of controlling coffee density exiting from a coffee densifier is disclosed. The method includes feeding a ground coffee into a mixing chamber having a discharge door, measuring a mixer motor load on a mixer motor driving mixing members agitating the ground coffee in the mixing chamber, and moving the discharge door when the mixer motor load is outside a predefined mixer motor load operating range to increase or decrease the amount of residence time the ground coffee is retained in the mixing chamber.

In some embodiments, the step of moving comprises the step of retracting the discharge door a predefined distance to increase the amount of residence time the coffee is retained in the mixing chamber when the mixer motor load is below the mixer motor load operating range.

In some embodiments, the step of moving comprises the step of opening the discharge door a predefined distance to decrease the amount of residence time the coffee is retained in the mixing chamber when the mixer motor load is above the mixer motor load operating range.

In some embodiments, the step of moving comprises the step of moving the discharge door when the mixer motor load is outside a predefined mixer motor load operating range to increase or decrease the amount of coffee chaff within the ground coffee exiting the mixing chamber.

In some embodiments, the step of moving comprises the step of retracting the discharge door a predefined distance to decrease the amount of coffee chaff within the ground coffee exiting the mixing chamber when the mixer motor load is below the mixer motor load operating range.

In some embodiments, the step of moving comprises the step of opening the discharge door a predefined distance to increase the amount of coffee chaff within the ground coffee exiting the mixing when the mixer motor load is above the mixer motor load operating range.

Each of the foregoing method steps can be implemented as a function of a controller programmed to instruct the discharge door actuator to move the discharge door the carry out the steps.

Numerous other advantages and features of the present invention will become readily apparent from the following detailed description of the invention and the embodiments thereof, from the claims and from the accompanying drawings.

DETAILED DESCRIPTION

Figure 1:
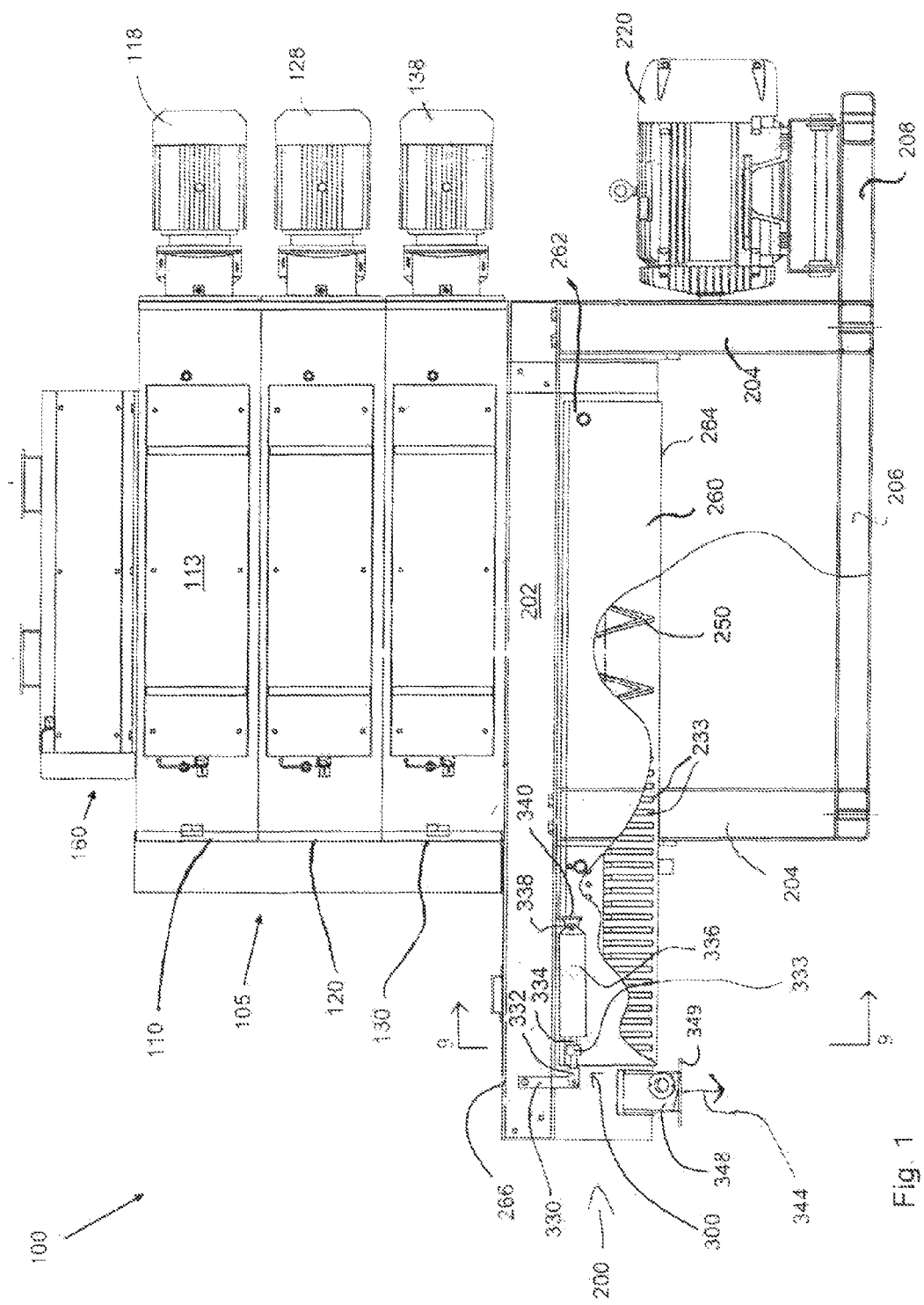
FIG. 1 is a side view of a coffee processor of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows coffee processor 100 having a coffee grinder 105 mounted above a mixer 200. The grinder section is for grinding coffee, such as whole bean coffee, into coffee grounds. The mixer polishes the rough edges of the coffee particles that come out of the grinder to increase the coffee density.

The grinder has a top grinding section 110, a middle grinding section 120, and a bottom grinding section 130. Each grinding section comprises a pair of grinding rollers 112, 114, 122, 124, 132, 134. The grinding rollers are journaled for rotation in a grinding roller support frame 116. The support frame 116 in each section 110, 120, 130, comprises a top entry opening 111a capable of allowing coffee product flow 199 to fall into the section and to come in contact with the rollers 112, 114. The support frame 116 also has bottom exit opening 111b to allow product flow to exit the section and proceed to through the top entry opening of the next adjacent section below or into the mixer 200. The support frame also includes side access doors 113 on opposite longitudinal sides of the section.

Each pair of grinder rollers comprise a fast roller 112, 122, 132 and a slow roller 114, 124, 134. The fast roller is close to an electric drive motor 118 and is rigidly mounted to the frame 116. The slow roller 114 is mounted on a movable frame member 117 to allow the slow roller to be adjusted in position relative to the fast roller. There exists a roller gap 119 between the rollers. The adjustment of the position of the slow roller 114 relative to the fast roller 112 changes the width of the roller gap 119 between the rollers.

Figure 4:
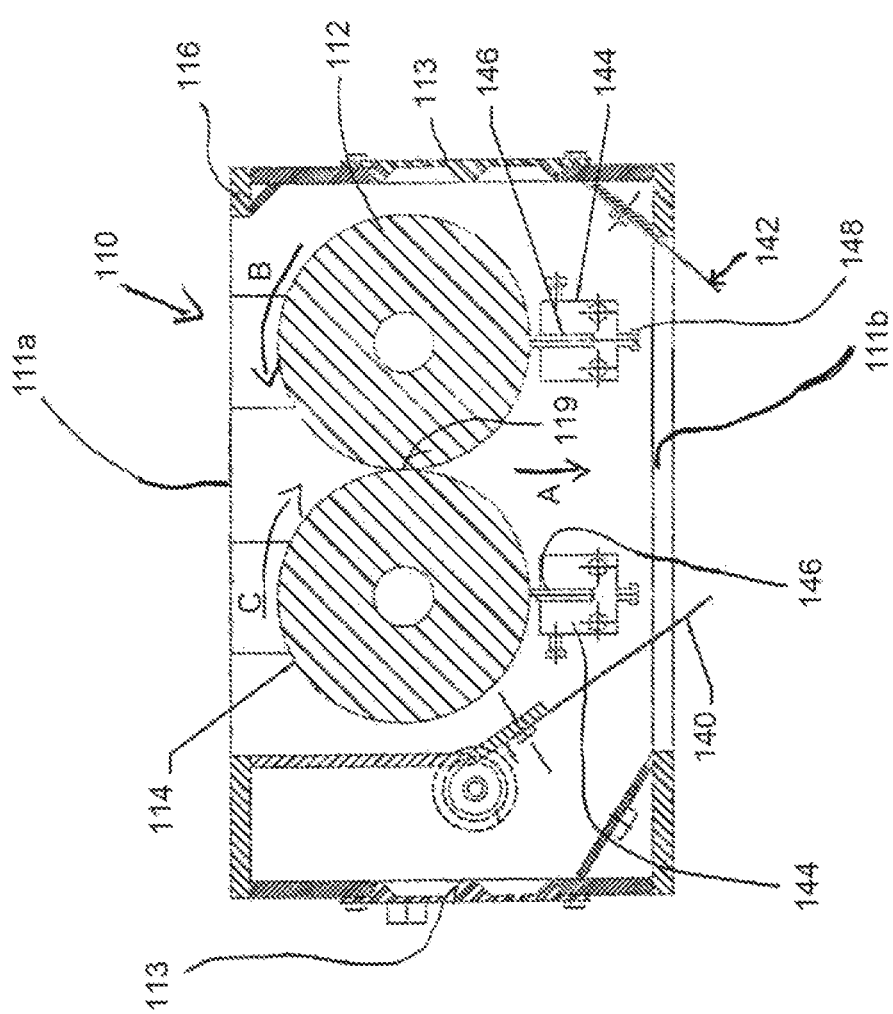
FIG. 4 is a cross-section view of a portion of a coffee grinder of the coffee processor of FIG. 1.
Figure 5:
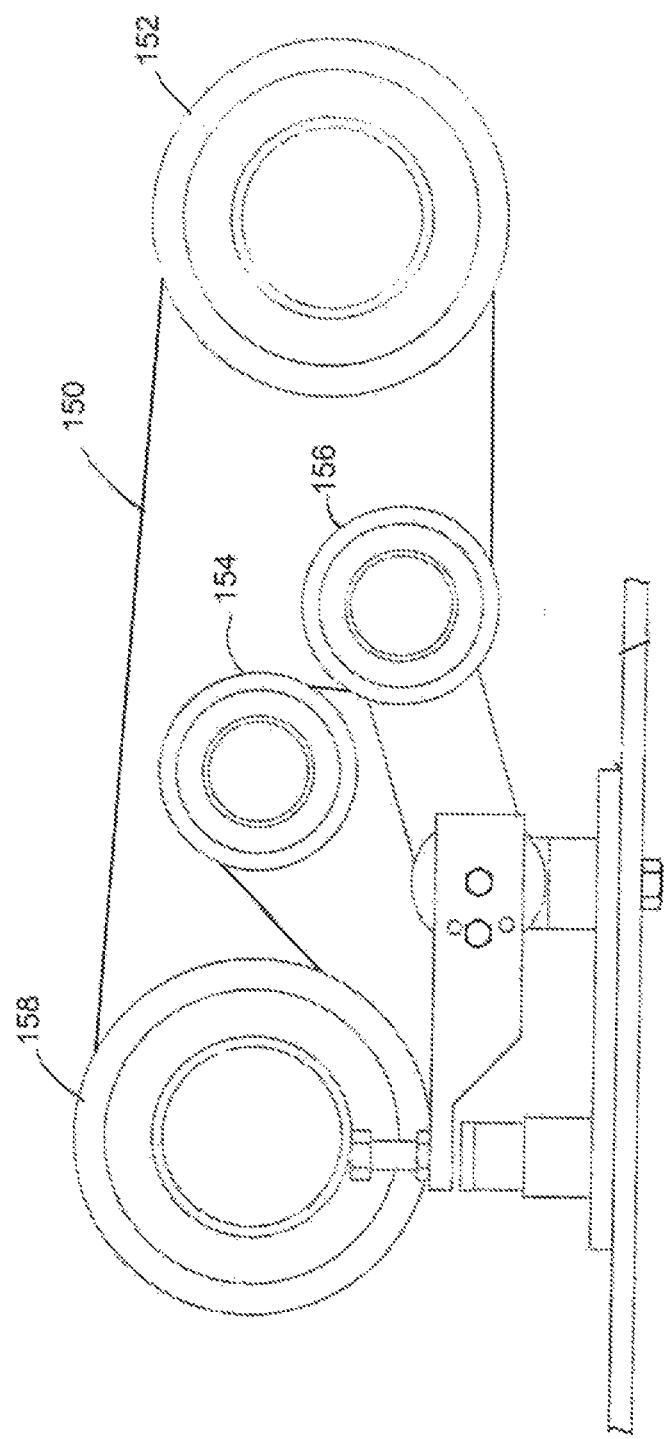
FIG. 5 is a grinder roller drive system of the coffee processor of FIG. 1.

A slow roller deflector 140 and the fast roller deflector 142 are each mounted to the frame 116 to guide the coffee out of the section. The fast roller deflector and the slow roller deflector are arranged in a converging orientation as shown in FIG. 4. Adjacent the bottom of the rollers are a scraper blocks 144 movably mounted to the frame 116 via an adjustment screw 148. A scraper bar 146 is mounted to each scraper block 144. The scraper bar is positionable in close proximity to the roller to prevent build-up of coffee material on the roller.

Figure 6:
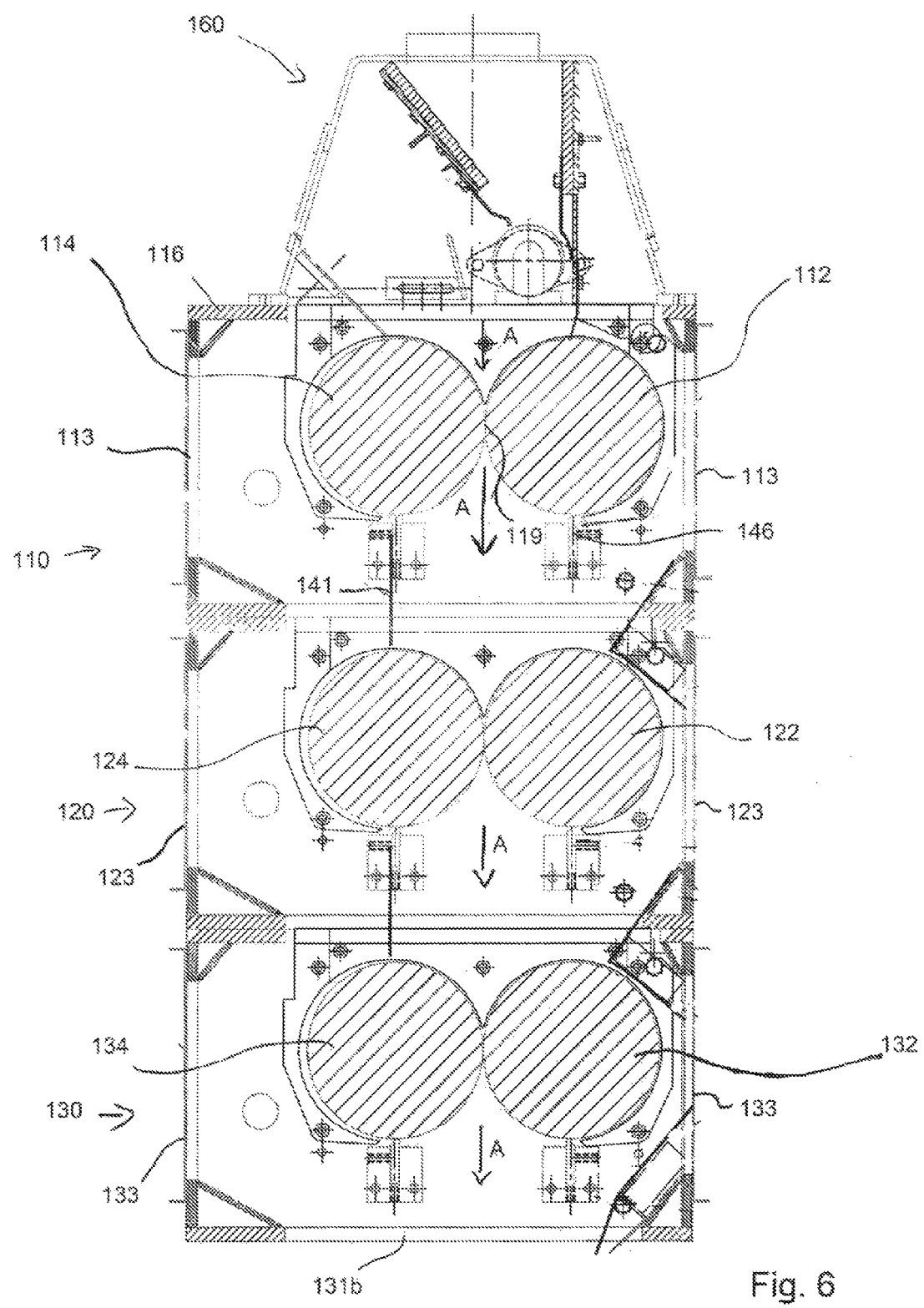
FIG. 6 is a cross-section end view the coffee grinder of the coffee processor of FIG. 1.
Figure 7:
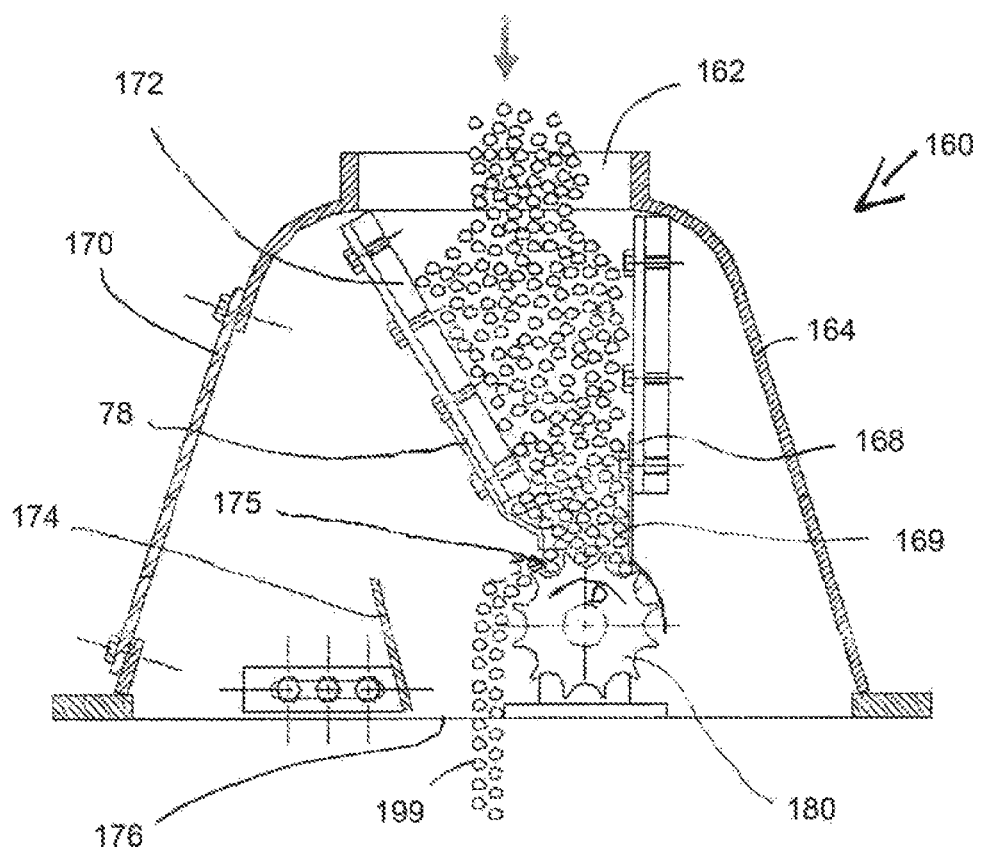
FIG. 7 is a cross-section end view of an inlet section of the coffee processor of FIG. 1.
Figure 8:
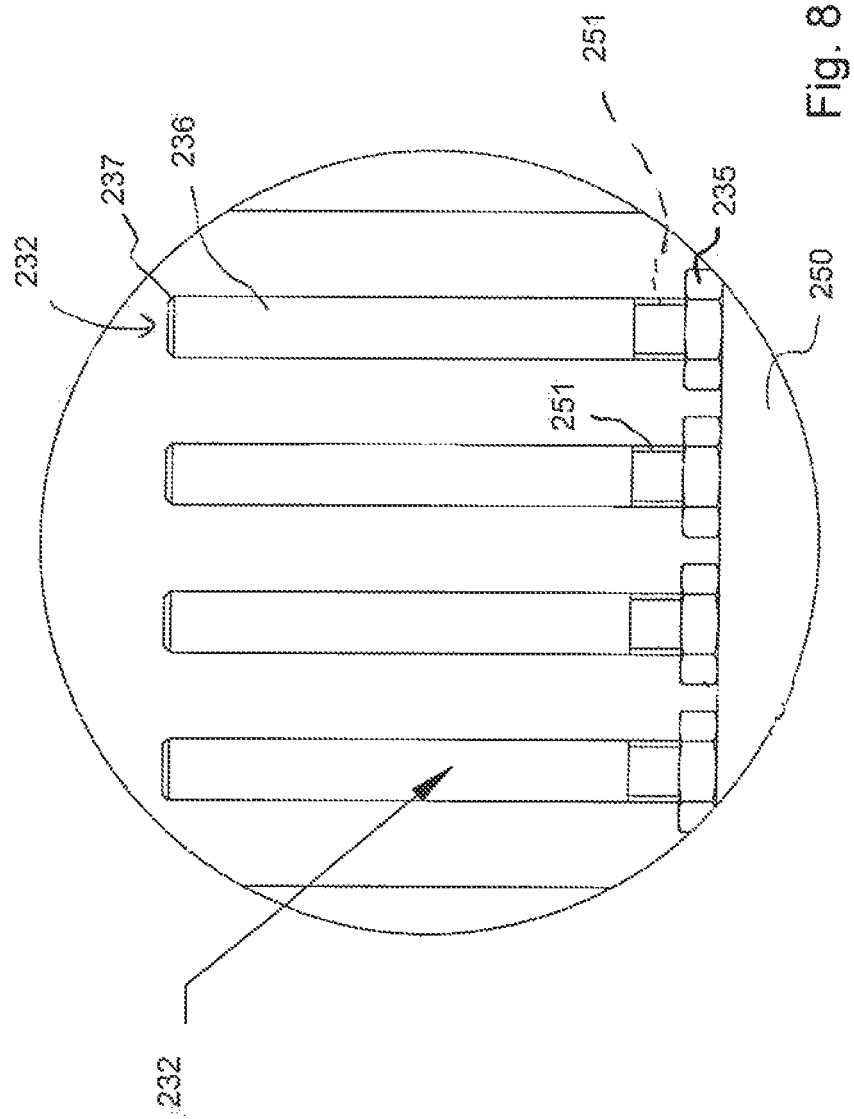
FIG. 8 is an enlarged view of pins of the mixer.

A second embodiment slow roller deflector 141 is shown in FIG. 6. The second embodiment slow roller deflector is arranged substantially in parallel to the product flow direction, labeled as direction A. As is shown in FIG. 6, each of the top grinding section 110, the middle grinding section 120, and the bottom grinding section 130 are arranged the same, except that the width of a roller gap 119 between the rollers in each section may be different than the gaps in the other sections and the bottom grinding section 130 does not have a slow roller deflector.

The fast roller 112 and the slow roller 114 are both driven by the electric drive motor 118 via a belt 150. The drive motor is mounted to a motor frame 115 that is mounted the grinding roller support frame 116.

A drive motor pulley 152 is connected to an output shaft of the drive motor 118. The belt 150 extends from the drive motor pulley 152 around a tensioner pulley 156 to a fast roller pulley 154 to a slow roller pulley 158 and back around the drive motor pulley 152. The fast roller pulley is connected to the fast roller. The slow roller pulley is connected to the slow roller. The belt drives the fast and slow rollers in opposite directions. As shown in FIG. 4, the fast roller 112 rotates in direction B and the slow roller 114 rotates in direction C. The slow roller pulley 158 is larger than the fast roller pulley 154 and therefore the slow roller rotates slower than the fast roller pulley. In some embodiments, the rollers are corrugated. The corrugation size, shape, and spiral affect the final particle size of the coffee. In some embodiments, the rollers are smooth.

Above the top grinding section 110 is an infeed section 160. The end of each section has a housing 164 with a top in feed inlet 162. Coffee, such as roasted whole bean coffee, is loaded through the inlet 162 and is guided to the feed roller 180 by a first guide plate 168, a second guide plate 172, a first stop plate 169, and a metering bar 178. The metering bar 178 is connected to the second guide plate 172. The metering bar 178 is adjustably positionable along the second guide plate 172 to vary the metering gap 175 between the end of the metering bar 178 and the feed roller 180. The metering gap 175 allows only a predefined amount of product to exit the inlet section through an exit opening 176 at the bottom and into of the top grinding section 110. An exit guide plate 174 ensures that coffee is directed into the correct location in the top grinding section 110. The infeed section 160 has a side opening covered by a door 170 that is bolted to the housing 164.

The rollers 112, 114 of the top grinding section 110 may be considered crusher rollers. The rollers of the middle grinding section 120 may be considered finish rollers. The rollers of the bottom grinding section 130 may be considered fine rollers. In some embodiments, the rollers are water cooled by a water cooling system that circulates water through the rollers during the grinder's operation.

In some embodiments, the processor 100 has a machine controller 404. The controller 404 controls aspects of machine operation including startup, shutdown, grind adjustment, roller gap, and coffee density control. The operator controls controller 404 using a user input device, such as a touch screen controller display panel 408 through a series of menus and user prompts provided on the user input device by the controller 404.

The controller 404 is signal connected with each motor 118, 128, 138 to control the operation of each motor. Each motor has a grinder motor power transducer 444, 446, 448 that reports the real-time power load being used by the motor. The controller 404 is connected with a plurality of sensor that report to the controller 404 the gap distance between each of the pair of rollers. The controller 404 is signal connected to a sensor that reports the operation and rate of feed of the feed roller 180 via a feed motor speed controller 442. The controller 404 is signal connected and controls a feeder motor 181 that drives the feed roller 180, thereby controlling the rate at which coffee is infeed to the grinding rollers.

The controller 404 is signal connected to a grinder thermocouple and a mixer discharge thermocouple. The grinder thermocouple is located at the bottom grinding section 130 to report by signal to the controller 404 the temperature of the coffee exiting section 130. The discharge temperature thermocouple is located on a discharge extension 348 to report by signal to the controller 404 the temperature of the coffee exiting the mixer. The controller 404 also controls the operation of the mixer as explained below.

Mixer. Product exiting the bottom exit opening 131*b* of the bottom grinding section 130 enters the mixer 200. The mixer 200 has an elongated housing 260 which is generally U-shaped in transverse cross-section. The upper portions of the side walls 262 are generally vertically orientated and parallel. The lower portion of the sides merge with a bottom 264 in a generally semicircular configuration in transverse cross-section. The housing has a chamber 213 provided with vertical rear and front walls 211, 238. The housing has two sections, a receiving portion 210 and a densifier portion 230.

The housing provides a top opening 212 so that the coffee discharged from the grinder may drop into and be received in the receiving section. The housing has a top cover 266 covering the housing from the top opening 212 to a least the front wall 238.

The mixer 200 has a mixer frame 202 that supported by four frame legs 204. The legs are configured to support the mixer 200 and the grinder 105 on an external surface such as the ground or a floor. The legs maybe connected at an end opposite the housing 260 by a pair of floor rails 206. Behind the rear most pair of frames legs 204, as shown in FIG. 1, is a mixer drive motor 220. The mixer drive motor is mounted to a mixer support frame 208 that connects with the rear pair of frame legs 204 and the floor rails 206.

The mixer comprises a mixer shaft 250 extending along a longitudinal centerline 252 of the mixer. The shaft 250 is supported at opposite ends of the shaft by front and rear bearing support members 240, 244. The bearing support members 240, 244 are connected to the mixer frame 202. The front bearing support member 240 receives a front mixer shaft bearing assembly 242 through which a front portion of the mixing shaft 250 is journaled for rotation. The rear bearing support member 244 receives and supports a rear mixer shaft bearing assembly 246 through which a rear portion of the mixing shaft 250 is journaled for rotation.

The front bearing support member 240 is located adjacent a front wall 238 of the densifier 230. The rear bearing support member 244 is located adjacent a rear wall 211 of the receiving portion 210.

The mixer motor 220 drives the mixing shaft 250 through a belt drive system. The belt drive system comprises a drive pulley 224, a driven pulley 226, and the drive belt 228. The drive pulley 224 is connected to the output shaft 222 of the mixer motor 220. The driven pulley 226 is connected to the mixing shaft 250. The drive belt is connected around the driven pulley 226 and the drive pulley 224 to transfer the rotary motion of the motor to the driven pulley and thereby to the mixing shaft 250. The mixer motor 220 is positioned below the housing 260 and supported on a support platform 209 connected to the mixer support frame 208.

Figure 9:
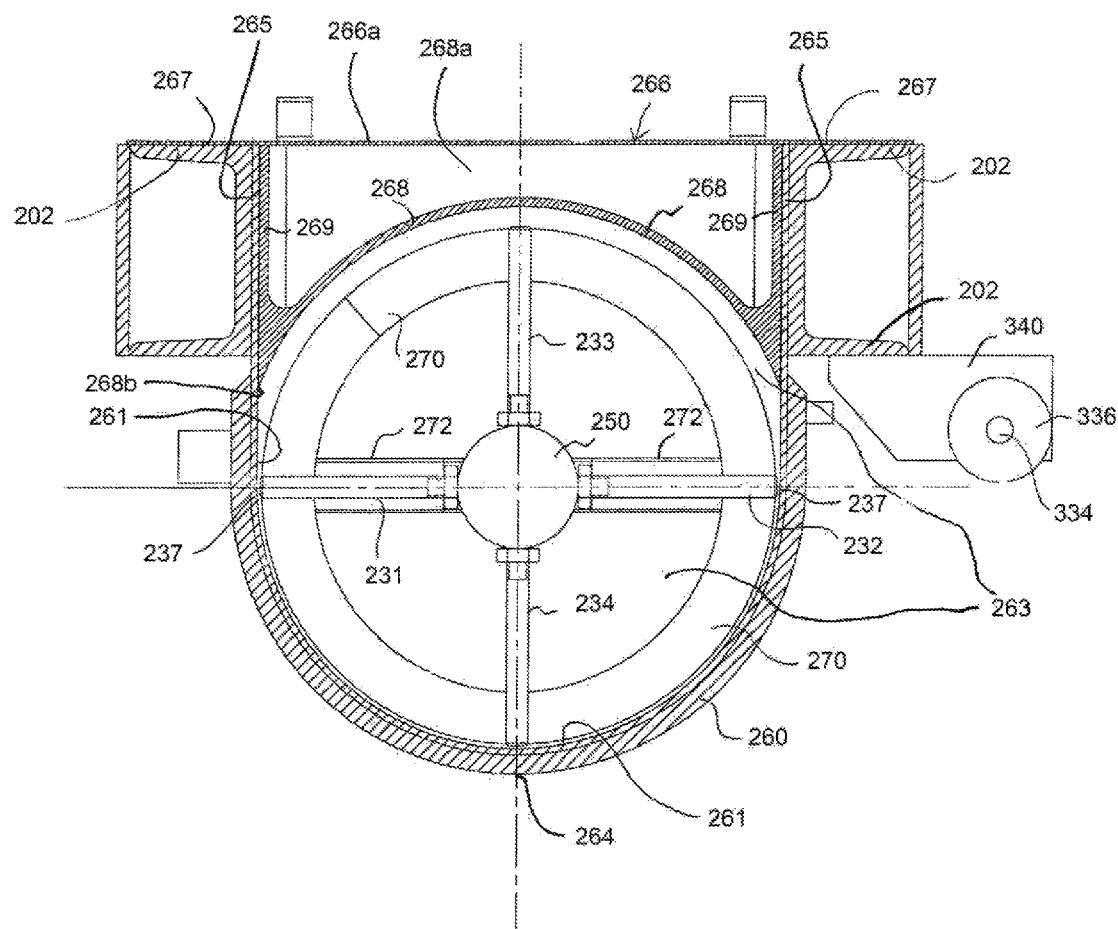
FIG. 9 is a section view of the mixer taken along the line 9-9 of FIG. 1.

A spiral auger 270 is connected to the mixing shaft by protruding tabs 272. The tabs are attached to the mixing shaft 250 by fasteners. As shown in FIG. 9, the tabs 272 space the auger 270 apart from the mixing shaft 250. The protruding tabs 272 extend from a portion of the spiral auger 270. The spiral auger turns in sync with the mixing shaft 250. The tabs 272 are at least located on opposite sides of the auger 270 about the mixing shaft 250. Therefore when the mixing shaft 250 is in the position shown in FIG. 2 the tabs 272 attached at a first tab connection on a surface of the mixing shaft and at an opposite second tab location 273. The spiral auger 270, as it rotates, moves coffee from the receiving portion 210 towards the densifier portion 230. In some embodiments, the auger 270 extends at least 50 percent of the length of the chamber 213. In some embodiments, the auger 270 extends between 40 and 70 percent of the length of the chamber 213 with the remaining length comprising the densifier portion.

Figure 2:
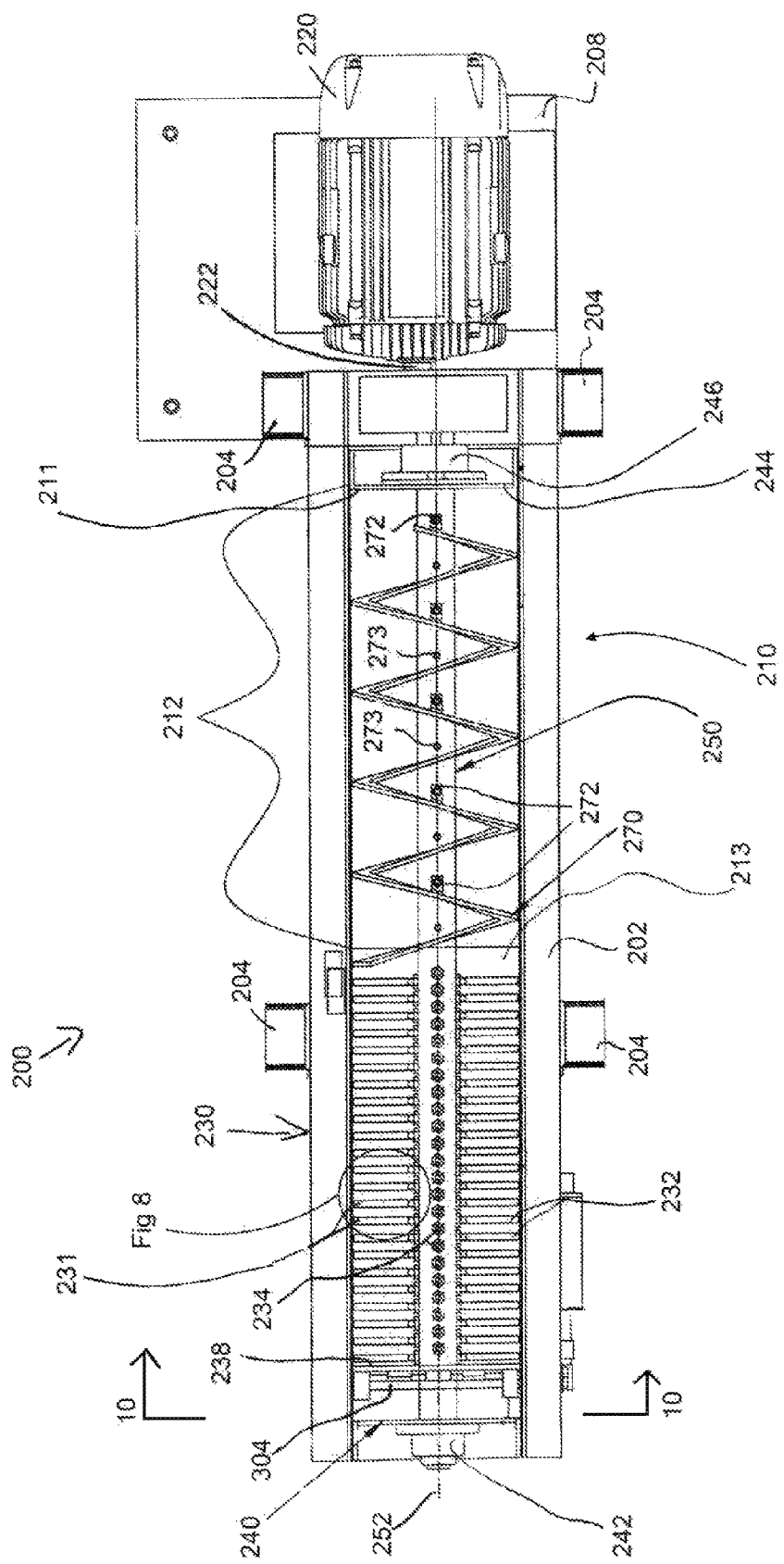
FIG. 2 is a top view of a mixer of the coffee processor of FIG. 1.
Figure 3:
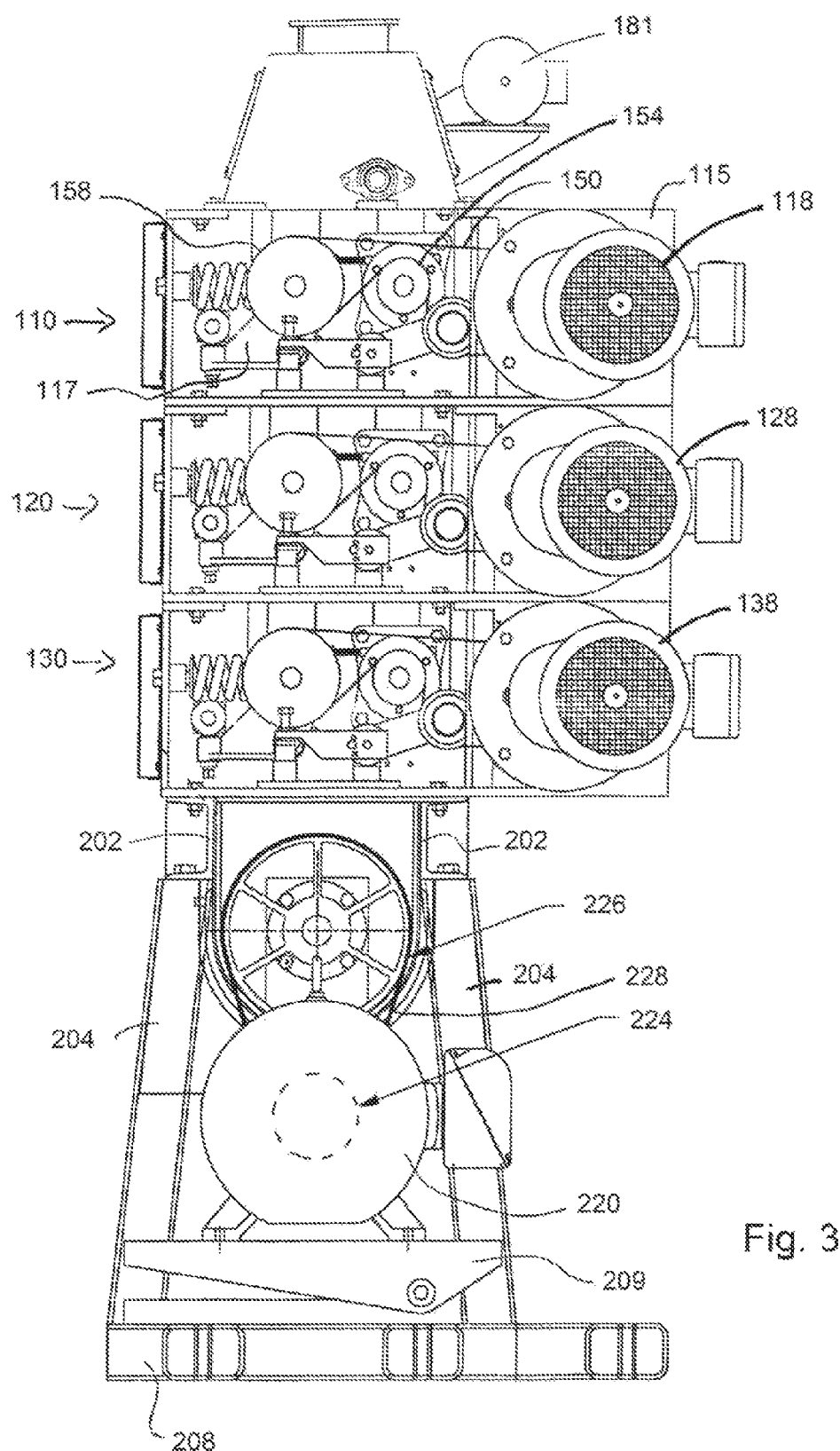
FIG. 3 is an end view of the coffee processor of FIG. 1.

Pins 231, 232, 233, 234 are connected to the mixing shaft 250 in the densifier portion 230. Pins 231, 232, 233, 234 are all identical. As is shown in FIG. 2, the pins 232, 234 begin along the mixing shaft adjacent the end of the spiral auger 270. As is shown in FIGS. 2 and 9, the pins are arranged in four rows that provide a cross formation extending radially from the mixing shaft 250. Each radially adjacent pin is positioned ninety degrees from the other radially adjacent pins in each radial direction. Pins 231 are opposite pins 233 and are aligned through a vertical cross-section. Pins 232 are opposite pins 234 and are aligned through a vertical cross-section. Radially adjacent pins, such as pins 231 and 233, are offset in the longitudinal direction of the shaft 250 as shown in FIG. 2. Therefore pins 231, 232 are not aligned with pins 234, 233, through a vertical cross-section. The radially adjacent offset nature of the pins allows better contact with coffee during the normalization and densifying process in the densifier.

In some embodiments, the each longitudinally adjacent pin along the length of the mixing shaft is paced 0.875 inches from the next longitudinally adjacent pin. In some embodiments, a longitudinally centerline of the each longitudinally adjacent pin along the length of the mixing shaft is paced 1.5 inches from a longitudinally centerline of the next longitudinally adjacent pin.

Each pin 231, 232, 233, 234 has a shaft 236 extending from a nut head 235. Opposite the nut head 235 is a tapered distal end 237. In some embodiments, the shaft 250 comprises a plurality of thread pins studs 251 extending from the distal surface of the shaft 250. Each pin has a hollow threaded opening opposite the tapered distal end 237. The hollow threaded opening mates with the threaded pin stud 251 and the nut head 235 enables the user to tighten the pins down to the surface of the mixing shaft 250. In some embodiments, the mixing shaft 250 has a plurality hollow threaded holes that receive a threaded stud extending from the nut head 235 of each pin. In either embodiment, the removal ability of the pins through the threaded attachment with the mixing shaft 250 allows pins to be individually replaced if they are worn or damaged.

In some embodiments, the pins 231, 232, 233, 234 are hardened through a traditional process of hardening metal, which may include heading the pins to a predefined temperature and then cooling the pins to increase pin strength. During operation the pins are rotated by the shaft 250 to agitate a bed of coffee within densifier portion 230. This agitation by the pins increases the bulk density of the coffee by polishing the rough edges of the coffee particles that come out of the grinder. The more time the coffee particles spend in the densifier portion 230 the more polished the coffee particles become. As the rough edges are polished the particles can fit closer together relative to the others and therefore the resulting coffee density is increased.

Referring to FIG. 9, the tapered distal end 237 of the pins 231, 232, 234 are located in close proximity to the inside surface 261 of the housing 260. This ensures that all coffee in the densifier portion 230 is agitated during the rotation of the pins and moved and no substantial amount coffee is allowed to sit at the bottom of the housing 260 unmoved. The housing 260 is provided with the cover 266. The cover has support wings 267 which rest on top of the frame 202 on opposite sides of the housing 260 and support the cover. Between the wings 267, and an opposite the top surface 266a is a semicircular lid bottom 268. The lid bottom 268 is connected to a top surface 266a of the cover by lid side walls 269. An open space 268a exists between the top surface 266a and the lid bottom 268. The lid sidewalls 269 contact with or are in close proximity to the upper side walls 265 of the housing 260. When the cover is placed over the housing 260 as shown in FIG. 9, the lid bottom to 268 and the inside surface 261 of the housing below a lower most edge 268b of the lid bottom form a chamber 263 within which the pins operate the densification process on the coffee. More space is provided between the lid bottom 268 and the pins then is provided between the inside surface 261 of the housing 260 and the pins. The cover 266 and the lid bottom 268 insurer that coffee is kept in close proximity to the pins during operation and that coffee is not thrown into dead space above the pins that might otherwise exist without the lid bottom 268.

The mixing shaft of mixer 200 having pins 231, 232, 233, 234 can be operated at twice the rotation speed of certain prior art mixers using paddles. The mixer 200 having pins realizes a 30% to 35% reduction the energy needed to turn the mixer shaft with pins, as compared to prior art mixers using paddles, to achieve the same density in the coffee output from the mixer as the prior art paddle mixers. This reduction in energy is achieved even with an increased rotation speed of the pins as compared to prior art paddle mixers. The mixer 200 having pins is capable of achieving a higher coffee density without negatively impacting the coffee, such as by imparting too much heat to the coffee, than can be achieved with prior art mixers using paddles. This is due, at least in part, to the reduced drag against the coffee created by the pins as compared to the prior art paddles. Further, in some embodiments, the mixing shaft 250 has more pins than paddles found in prior art mixers.

Automatic Density Control System. The mixer 200 has an automatic density control system (ADCS) 300. The ADCS 300 controls a discharge door 310 through a linear actuator, such as pneumatic cylinder 336. The discharge door 310 is located in a discharge door opening 239 of the front wall 238. The pneumatic cylinder is connected to a pressurized are supply system.

Figure 10:
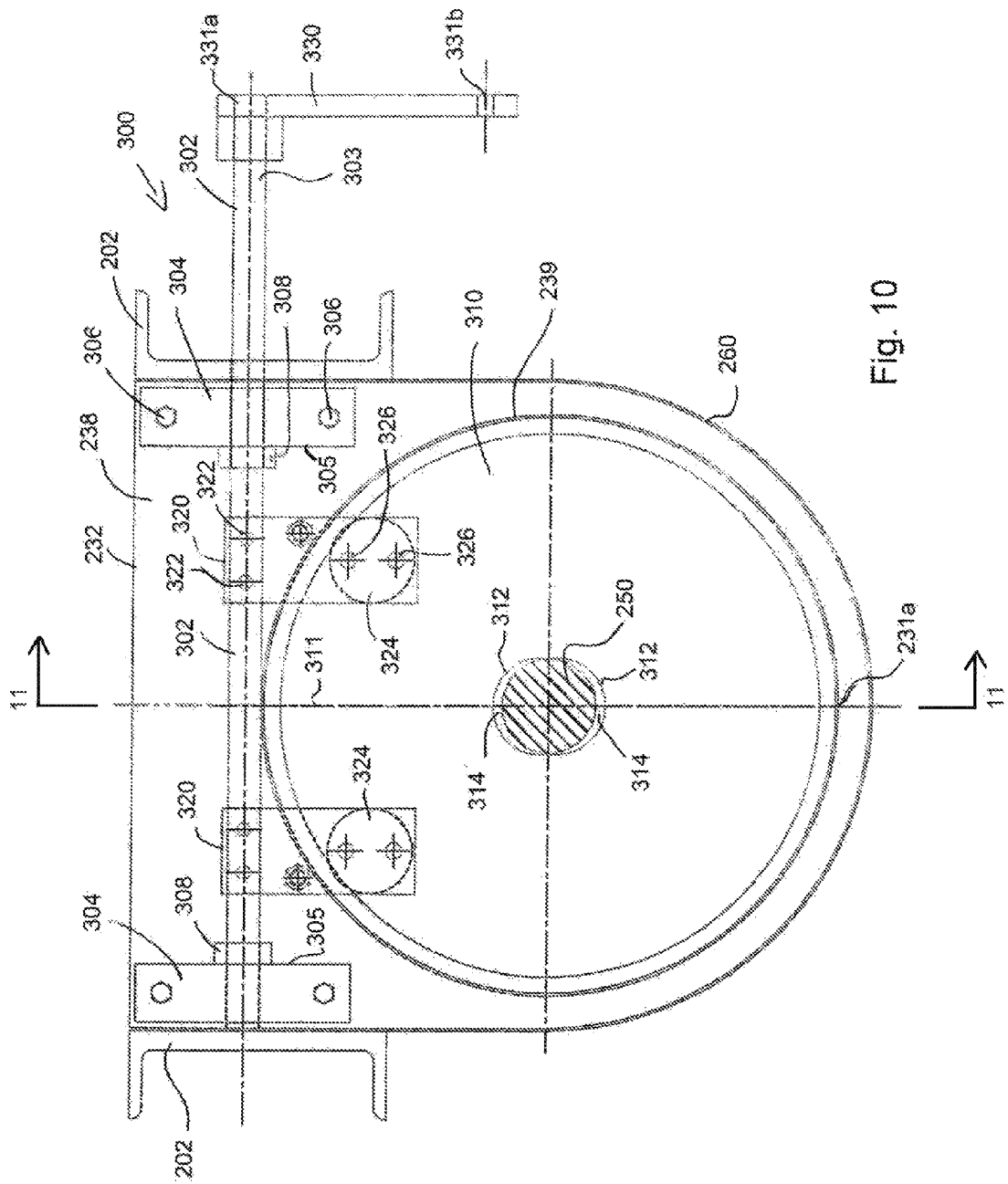
FIG. 10 is a section view of the mixer taken along line 10-10 of FIG. 2.
Figure 11:
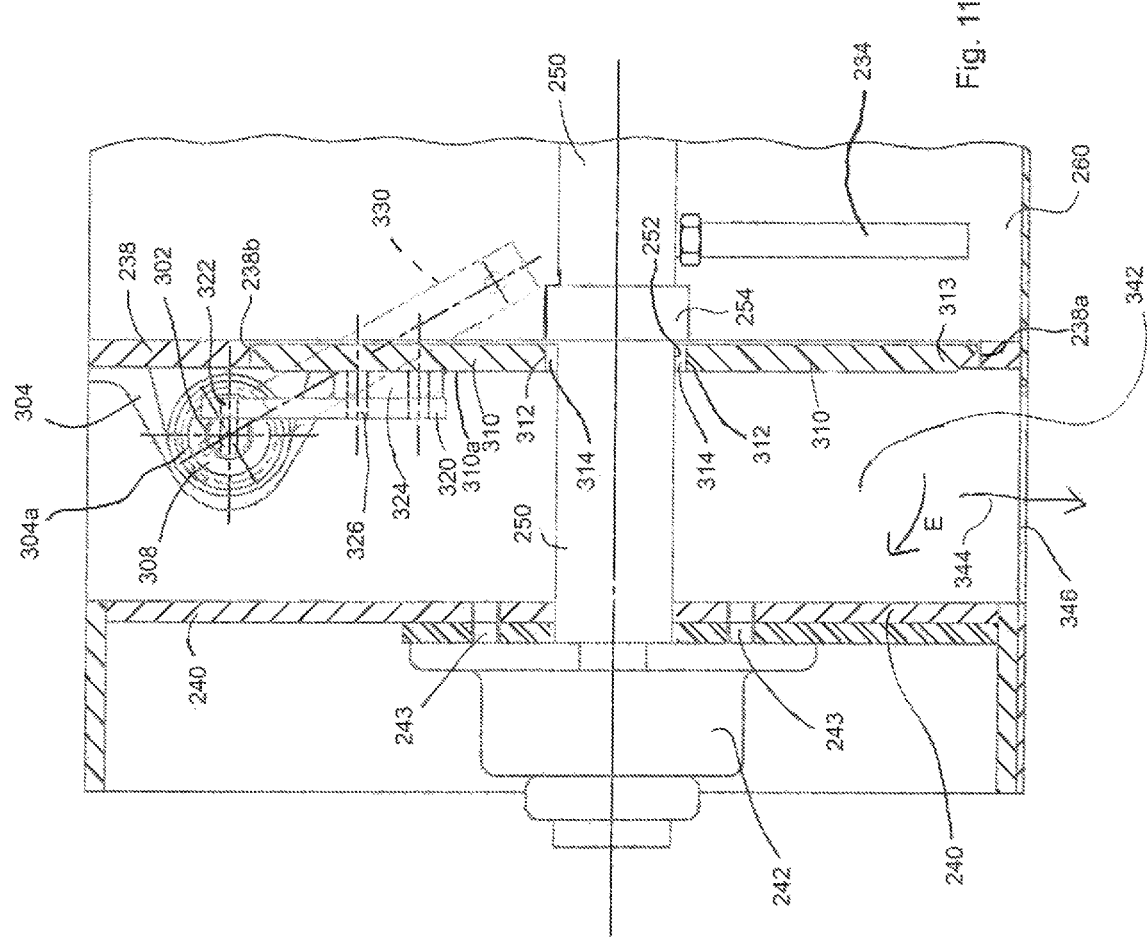
FIG. 11 is a section view of the mixer taken along line 11-11 of FIG. 10.
Figure 12:
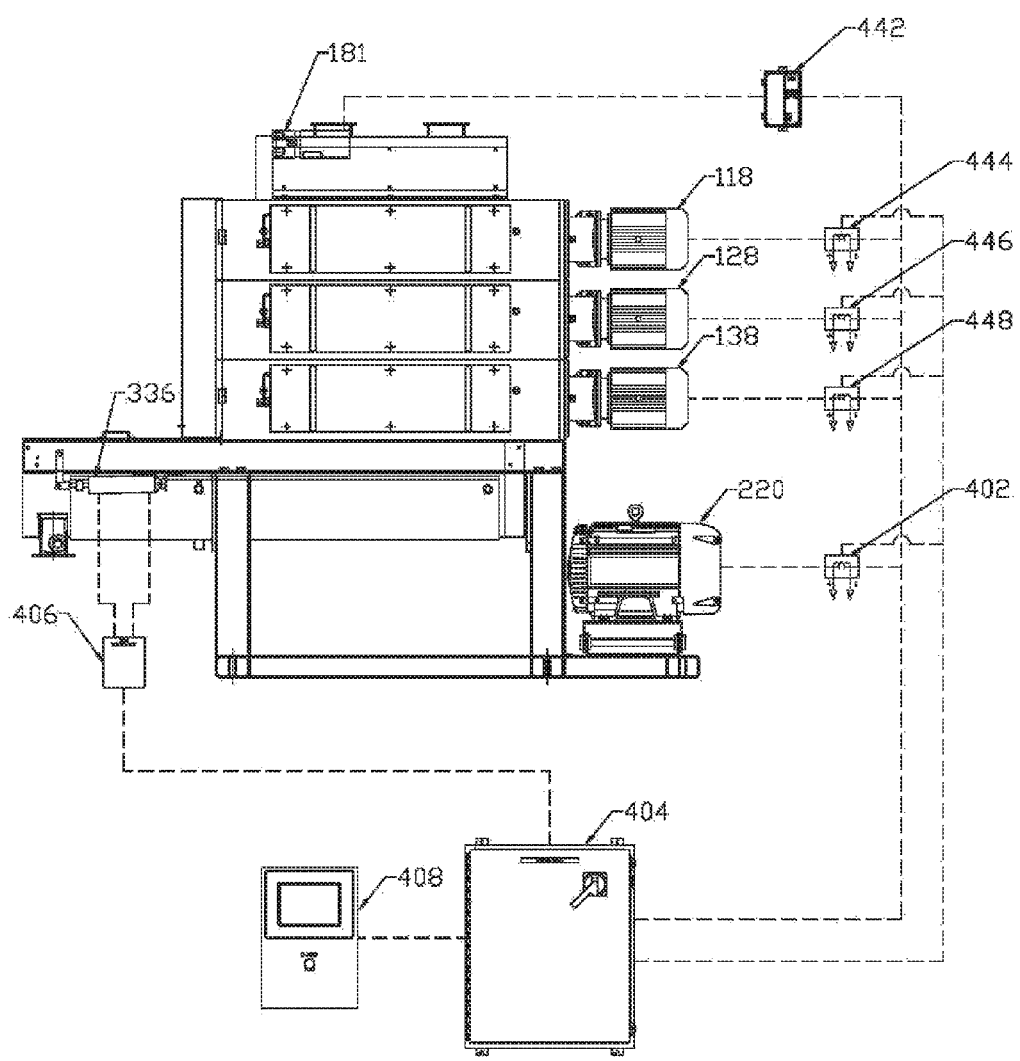
FIG. 12 is a schematic view of the machine controller and connected components.

The discharge door arrangement is shown in FIGS. 1, 2, 10, and 11. The discharge door 310 occupies a discharge door opening 239 in the front wall when the discharge door is in a full closed position. The discharge door is movable between the full closed position and a full open position and any position between the full closed and full open positions. The discharge door is fixed to a pivot rod 302 by a pair of door brackets 320. At a top end of the door bracket, a pair of fasteners 322 fix the door bracket to the pivot rod 302. At a bottom end of the door bracket opposite the top end, a door bracket spacer 324 is positioned between the back surface of the door bracket 320 and a surface of the discharge door 310. A pair of fasteners (not shown) are fixed through a pair of the mounting holes 326 that extend through the door bracket, through the door bracket spacer, and into the door. The door bracket spacer 324 may be a circular shape such as shown in FIG. 11 or may be any other shape. The door brackets 320 are spaced apart about a vertical mid-line 311 of the door 310 as shown in FIG. 11.

The rod 302 is pivotally connected to the front wall 238 by a pair of spaced apart pivot rod supports 304. The pivot rod supports 304 are attached to the front wall 238 by a pair of fasteners 306. Each pivot rod support 304 has an opening 304a through which the pivot rod extends and pivots therein. A pair of pivot rod collars 308 may be fixed to the pivot rod adjacent inside walls 305 of each pivot rod support 304. The collars 308 prevent the transverse movement of the pivot rod and thereby maintain the transverse position of the discharge door 310 relative to the discharge door opening 239. In some embodiments, a bearing assembly is contained within the pivot rod support to facilitate the movement of the pivot rod.

The discharge door 310 has a center opening 312. The center opening 312 comprises an upper semicircular portion and a lower semicircular portion. Each semicircular portion allows gaps 314 between the discharge door 310 and the shaft 250 in the upper and lower areas of the center opening 312 when the door is in the closed position. The gaps 314 allows a bottom end 313 of the discharge door 310 can move away from the front wall 238 in the direction E shown in FIG. 11 to create an opening between the discharge store 310 and the front wall 238. In some embodiments, the gaps 314 are sufficient to allow the discharge door 310 to move in the direction E to the point where the bottom of discharge door makes contact with or is adjacent to the bearing support plate 240. As the door pivots open about the pivot rod 302, the gap between the discharge door 310 and a bottom edge 238a of a front wall 238 is greater than the distance between the discharge door 310 and a top edge 238b of a front wall 238. A mixing shaft collar 254 is located on the densifier side of the discharge door adjacent the pins as shown in FIG. 11. The mixing shaft collar 254 prevents coffee from escaping from the densifier portion 230 through the gaps 314 when the door is in the full closed position.

The pivot rod 302 extends outside of a frame member of the frame 202 to connect to pivot arm 330 as shown in FIG. 10. A top end 331a of the pivot arm 330 is fixed to the pivot rod 302. A bottom end 331b receives a pin connecting a connector 332 attached to a piston rod 334 of the pneumatic cylinder 336. A rear end of the pneumatic cylinder 336 is pivotally attached to a linear actuator support 340 that is fixed to the frame 202 as shown in FIGS. 1 and 9.

In some embodiments, a knurled adjustment collar 333 is located along the cylinder rod 334. The location of the adjustment collar 333 can be moved along the rod to manually set a cylinder rod minimum beyond which further retraction into the cylinder is not possible. Turning the collar 333 changes the preload on an internal pilot (not shown) inside the cylinder. The adjustment collar is held in place with two lock screws that must be loosened before turning the collar.

When the discharge door 310 is in any open position, as positioned by the pneumatic cylinder, coffee will be allowed to be discharged passed the discharge door 310, down through a discharge passage 342, along a discharge path 344, passing out a discharge opening 346 and out though a discharge extension 348 to an external receptacle (not shown). The discharge extension 348 has a flange 349. The flange 349 has at least to bolt holes (not shown) for securing the attachment of an external pipe, hose, or other connector.

The ADCS 300 comprises a mixer motor power transducer 402, the controller 404, and a cylinder controller 406, the cylinder 336, and the discharge door 310. The power transducer 402 measures the power consumed by the mixer motor 220 and sends a load signal in the range of 4 milliamps (mA) to 20 mA to the controller 404 depending on the power consumed by the mixer motor 220. The pneumatic cylinder is positioned by the properly distributed compressed air provided by the cylinder controller 406, using the supplied air pressure, and positions the pivot arm 330 and thereby a discharge door 310 in any position within of the stroke pneumatic cylinder. In some embodiments, the cylinder controller is a current-to-pneumatic controller. In some embodiments, the cylinder controller is a current-to-position controller.

The controller 404 has, or is in signal communication with, a controller display panel 408. In some embodiments, the controller display panel 408 is a touch screen having user-interactive portions where the display panel is capable of receiving user input by a user touching one or more touch areas of the display panel. In some embodiments, the controller display has a screen displaying a power value display portion 412, a mixer motor load setpoint value display portion 414, a mixer speed setpoint display portion 410, a status display portion 418, a door position display portion 416, manual/auto selector button 426, an up value button 420, a down value button 422, and a reset button 424.

Figure 13:
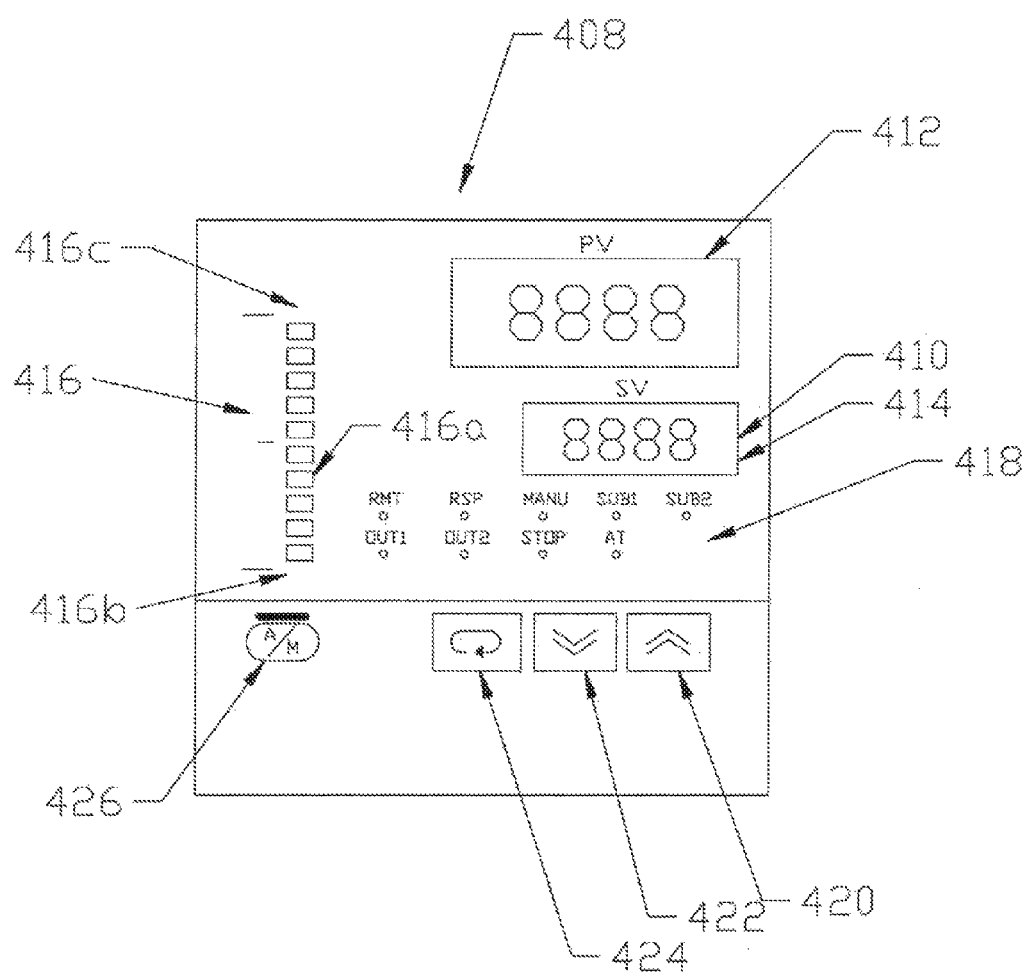
FIG. 13 is an exemplary screen of a display that is connected to the machine controller.

The power value display portion 412 is configured to display the current power being consumed as reported to the controller the power transducer 402. The mixer motor load setpoint value displayed portion 414 is configured to display a mixer motor load setpoint. The mixer speed setpoint display portion 410 is configured to display the mixer shaft rotation speed setpoint. In some embodiments, when the display panel 408 is a touch screen, buttons 420, 422, 424, 426 are touch areas capable of receiving user input. In some embodiments, each of the display portions 410, 412, 414, 416, 418 comprise a digital display and the buttons 420, 422, 424, 426 are physical buttons. In some embodiments, less than all of the display portions shown in FIG. 13 may be provided on the display panel 408. In some embodiments, the mixer speed setpoint display portion 410 is provided on a separate display (not shown) connected to the controller. It will be appreciated that the display portions shown in FIG. 13 can be provided on the same display panel or on one or more separate displays and/or remote displays.

In some embodiments, instead of providing one machine controller 404 that controls the operation of the entire grinder and mixer combination, a separate grinder controller and mixer controller are provided. In such an embodiment, the controllers are signal connected to each other so that appropriate data can be passed between each.

The door position display portion 416 is configured to display the degree to which the discharge door 310 is open. In one embodiment, the door position display portion 416 comprises a number of indicators 416a between a bottom 416b and a top 416c. The position of the discharge door 310 is shown by the proportion of indicators illuminated between the bottom and the top of the discharge display portion 416. The more indicators 416a that are illuminated correspond to a greater degree of opening of the discharge door 310. In some embodiments, the degree of discharge door opening is displayed in as a numeric value. In some embodiments, the degree of discharge door opening is represented as a graphical picture showing the degree of door opening.

The status display portion 418, provides a number of mode indicators (not shown) that indicate the status of various components of the automatic density control system. For example, a manual/automatic mode status indicator may be provided in the status display portion 418 to indicate whether the automatic density control system is in a manual mode or in automatic mode. The manual/auto selector button 426 enables a user to select between the manual mode or the automatic mode.

The up value button 420 and the down value button 422 are configured to enable a user to adjust any user adjustable values or settings, including the mixer load setpoint when the automatic density control system is in the automatic mode and the discharge door 310 position when the automatic density control system is in the manual mode. The reset button 424 enables a user to reset user definable settings, such as the mixer motor load setpoint value to a predefined default and also to reset the door position value to a predefined default.

In operation, the machine controller 404 implements a mixer load control function that is configured to compare a mixer motor load signal received from the power transducer 402 to the mixer motor load setpoint, which may be predefined or may be set by the operator at the controller display panel 408 by using the up value button 420 or the down value button 422, or via a physical or on-screen keyboard (not shown). The controller 404 receives real-time data on the power being consumed by the mixer motor 220 through the power transducer 402, which is displayed on the power value display portion 412 of the controller display panel 408 by the controller 404.

The controller 404 has a mixer startup function that functions during initial grinding. The controller 404 positions the discharge door in the full closed position until coffee in the mixer has reached a predefined level defined by the motor load setpoint that was predefined or defined by the operator at the controller display panel 408. If the motor speed remains constant, larger amounts of coffee in the mixer will result in a higher motor load and smaller amounts of coffee in the mixer will result in a lower motor load. Therefore there is a correlation between the amount of coffee in the mixer and the mixer motor load for a given mixer speed.

If the discharge door is in the completely closed position and coffee is being added to the mixer by the grinder the the amount of coffee in the mixer will increase. The increase in the amount of coffee in the mixer will increase the load on the mixer motor 220 because additional energy will be required to rotate spiral auger 270 and the pins 232, 234 against the increased amount of coffee in the mixer. Once the load on the mixer motor 220 reaches the motor load set point, the controller 404 will signal the pneumatic cylinder 336, through the cylinder controller 406, to extend the cylinder rod 334 and open the discharge door 310 a predefined distance. As coffee is allowed to escape through the discharge, the motor load will increase at a decreasing rate, will stabilize, or will be reduced depending on the rate of inflow of coffee from the grinder and the degree to which the discharge door is open. Preferably, the door will be opened a sufficient distance so that the motor load stabilizes at the predefined set point.

During operation the a mixer load control function of the controller 404 continuously, or at regular intervals, monitors the load on the mixer motor 220 through the signal received from the power transducer 402. When coffee is being constantly fed into the mixer from the grinder, a flow of coffee is passing through the mixer from the receiving portion 210 through the densifier portion 230 and out the discharge extension 348. The controller 404 will continuously, or at regular interval, signal the cylinder controller 406 to signal the cylinder rod to extend to open the discharge door a predefined amount or to retract the discharge door a predefined amount to maintain a consistent motor load by adjusting the amount of coffee resident in the mixer at a given time.

If the mixer motor load signal is above the mixer motor load setpoint, the controller 404 will send a signal to the cylinder controller 406, which will signal to the pneumatic cylinder to extend the cylinder rod a predetermined distance to open the discharge door in the direction E in FIG. 11 a predetermined amount. Further opening the discharge door will result coffee in the mixer being discharged at a faster rate, so that less coffee is retained in the mixer and the coffee spends a less amount of time in the mixer. As less coffee is retained in the mixer, the coffee will provide less of a load the mixer motor 220 because less energy is required to rotate a smaller amount of coffee within the mixer.

If the mixer motor load signal is below the mixer motor load setpoint, the machine controller 404 will send a signal to the cylinder controller 406 which will signal to the pneumatic cylinder to retract the cylinder rod a predetermined distance to retract the discharge door 310 in the direction opposite direction E in FIG. 11 a predetermined amount. Retracting the discharge door will result in coffee in the mixer being discharged at a slower rate, so that more coffee is retained in the mixer and the coffee spends a longer amount of time in the mixer. As more coffee is retained in the mixer, the coffee will increase the load the mixer motor 220 because additional energy is required to rotate spiral auger 270 and the pins 232, 234 against the increased amount of coffee in the mixer.

When coffee is resident within the densifier portion 230, the coffee is subjected to the impact of the pins 232, 234 and a corresponding agitation with other coffee materials within the densifier portion 230. One way of increasing the density in the coffee discharged from the mixer, is to increase the motor load set point. A higher mixer motor load setpoint will reduce the coffee chaff and increase coffee density. Coffee chaff is created during the grinding operation and the densifier operates to break up the chaff as well as to densify the coffee. An increased motor load set point corresponds to coffee being retained in the densifier portion 230 for a longer period of time. A higher mixer motor load setpoint will also raise the coffee temperature. Therefore, it is preferred to use to lowest motor load set point that will achieve the desired coffee density.

A higher mixer shaft rotation speed setpoint will result in higher coffee density. An increase in the mixer shaft rotation speed will increase the speed at which coffee in the densifier achieves a given density. Therefore operating the mixer shaft at an increased speed on the same amount of coffee in the densifier will increase the load on the mixer motor, thereby causing the discharge door to be opened to a larger degree to maintain the load at the motor load set point. Operating the mixer at a faster speed on a given volume of coffee in the densifier will increase the throughput of coffee out of the mixer. Correspondingly, throughput can remain constant if the volume of coffee is reduced proportionally when the mixer shaft speed is increased.

Retracting the discharge door while the mixer is operating and being fed with a relatively constant flow of coffee grounds from the grinder will (1) decrease the rate at which coffee exits the mixer, (2) increase the mixer motor load, (3) increase the density of the coffee exiting the mixer, (4) increase the resident time which the coffee grounds are retained in the mixer before exiting, and (5) will decrease the amount of coffee chaff in the exiting coffee. Opening the discharge door while the mixer is operating and being fed with a relatively constant flow of coffee grounds from the grinder will (1) increase the rate at which coffee exits the mixer, (2) decrease the mixer motor load, (3) decrease the density of the coffee exiting the mixer, (4) decrease the resident time which the coffee grounds are retained in the mixer before exiting, and (5) increase the amount of coffee chaff in the exiting coffee.

In some embodiments, the mixer motor load setpoint is a mixer motor load operating range. The controller 404 is configured to move the discharge door when the mixer motor load is outside of the mixer motor load operating range.

In one embodiment the controller 404 utilizes proportional-integral-derivative logic to calculate the output signal that should be sent to the cylinder controller 406. In some embodiments the cylinder controller 406 converts a signal in the range of 4 mA to 20 mA from the machine controller 404 to the proper cylinder position. In some embodiments, the controller 404 is programmable by the operator to adjust the maximum full open and full close positions of the discharge door 310 by setting a fully extended cylinder rod position and a fully retracted cylinder rod position.

In some embodiments, the controller 404 comprises a cleanout function. The cleanout function opens the discharge door 310 to the full open position after a predefined no-grind time period has elapsed in which the control receives a signal that the grinder motor load from one of the motors 118, 128, or 138 is below a predefined in-operation load setpoint. When such motor load is below the in-operation grinding load setpoint, no coffee is being ground as the grinding of coffee between the rollers generates the in-operation grinding load on the corresponding motor 118, 128, or 138. After the motor load has dropped below the in-operation grinding load set point for a predefined elapsed no-grind time period, the controller 404 signals to open the discharge door 310 for a predefined cleanout time period to allow the coffee material in the mixer to be discharged. The cleanout function is beneficial because if no additional coffee is being feed into the machine, then the motor load in the mixer will decrease. If the motor load in the mixer decreases, the controller 404 will signal the discharge to close proportionally the discharge door to maintain the mixer motor load at the predefined set point. Eventually the discharge door will close completely and the mixer will continue to agitate and rotate the coffee grounds. Excessive densification by the mixer may result in resulting coffee grounds that do not meet the operator's output requirements for coffee density.

In some embodiments, the controller 404 allows a user to set the cleanout door position that is used during the cleanout function so that the user may control the rate of coffee grounds discharged during the cleanout operation. The controller 404 may display a cleanout progress indicator on the display panel 408, which shows the progress in completely discharging the contents of the mixer.

In some embodiments, the mixer is water cooled. The mixer comprises a stainless steel water cooled jacket within the walls 262 and/or bottom 264 of the housing. The water cooling is achieved by circulating water through the water jacket. Water is circulated by one or more pumps controlled by the machine controller 404. The temperature of the coffee exiting the mixer is measured by the discharge temperature thermocouple. Circulating water through the water jacket dissipates heat from the mixer and the coffee therein. Water flow is started, stopped, increased or decreased to change the temperature of the mixer and the coffee therein.

The controller 404 may be a an application-specific integrated circuit (ASIC) having one or more processors and memory blocks including ROM, RAM, EEPROM, Flash, or the like; a programmed general purpose computer having a microprocessor, microcontroller, or other processor, a memory, and an input/output device; a programmable integrated electronic circuit; a programmable logic controller or device; or the like. Any device or combination of devices on which a finite state machine capable of implementing the procedures described herein can be used as the controller 404.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of densifying coffee, comprising the steps of:
feeding a ground coffee into an inlet of an elongated chamber from a coffee grinder driven by at least one grinder motor, to form a bed of ground coffee in the chamber, the chamber comprising the inlet, a shaft, a discharge opening, and a plurality of removable paddle-less pins fixed to the shaft;
polishing a plurality of coffee particles of the ground coffee within the elongated chamber by rotating the plurality of paddle-less pins through the bed of ground coffee, a densifier motor driving the shaft and the plurality of paddle-less pins to rotate through the bed of ground coffee independent from the at least one grinder motor;
measuring, with a motor load sensor, a motor load on the densifier motor driving the plurality of paddle-less pins polishing the ground coffee in the chamber;
moving a discharge door, by providing a signal from a controller to a discharge door actuator, when the controller detects the motor load, reported by the motor load sensor, is outside a predefined motor load operating range to increase or decrease a density of the ground coffee exiting the chamber through the discharge opening.

2. The method of claim 1, comprising the step of moving ground coffee from a receiving portion of the chamber adjacent the inlet toward a densifier portion comprising the plurality of paddle-less pins by rotating a spiral auger within the ground coffee in the receiving portion, the spiral auger is fixed to the shaft.

3. The method of claim 1, wherein the step of polishing comprises rotating a four rows of the plurality of paddle-less pins through the bed of ground coffee where each of the four rows is spaced about a circumference of the shaft in ninety degree increments.

4. The method of claim 1, wherein the step of polishing comprises rotating a plurality of rows of the plurality of paddle-less pins through the bed of ground coffee where the pins of each row are longitudinally offset along a length of the shaft from the pins in rows immediately radially adjacent.

5. The method of claim 1, wherein the step of polishing comprises rotating a plurality of rows of the plurality of paddle-less pins through the bed of ground coffee where the pins of each row are spaced about 0.8 inches apart from immediately adjacent pins in the same pin row.

6. The method of claim 1, wherein the step of polishing comprises rotating a plurality of rows of the plurality of paddle-less pins through the bed of ground coffee where each pin of the plurality of paddle-less pins has a uniform cross-section along its length from a base of the pin to a terminating end of the pin.

7. The method of claim 1, wherein the step of polishing comprises rotating a plurality of rows of the plurality of paddle-less pins through the bed of ground coffee where each pin of the plurality of paddle-less pins comprises a distal end width that is not greater than a base end width of the pin.

8. The method of claim 1, wherein the step of moving is further defined in that the discharge door is moved to increase or decrease each of (a) a rate at which the ground coffee exits the chamber, (b) the motor load, (c) a resident time which the ground coffee is retained in the chamber before exiting, and (d) an amount of coffee chaff in the ground coffee exiting the chamber through the discharge opening.

9. The method of claim 8, wherein the step of polishing is further defined in that the plurality of paddle-less pins are arranged on the shaft such that each of the plurality of paddle-less pins is either perpendicular or co-planar with every other pin of the plurality of pins on the shaft.

10. The method of claim 9, wherein the step of polishing is further defined in that each of the plurality of paddle-less pins comprises a threaded hollow proximal end that mates with a threaded stud extending from the shaft.

11. A method of claim 1, wherein the step of moving comprises the step of retracting the discharge door a predefined distance to increase the density of the ground coffee exiting the chamber when the motor load is below the motor load operating range.

12. A method of claim 1, wherein the step of moving comprises the step of opening the discharge door a predefined distance to decrease the density of the ground coffee exiting the chamber when the motor load is above the motor load operating range.

13. The method of claim 1, wherein the step of moving is further defined in that the motor load operating range is a motor load setpoint.

14. The method of claim 1, comprising the step of positioning the discharge door to a full closed position during a startup until the motor load reaches the motor load operating range.

15. The method of claim 1, comprising the step of positioning the discharge door in a full open position after a predetermined time period when no coffee grounds are being added to the chamber.

16. The method of claim 1, wherein the step of moving the discharge door is further defined in that the discharge door is moved
to increase or decrease an amount of residence time the ground coffee is retained in the chamber.

17. A method of claim 16, wherein the step of moving comprises the step of retracting the discharge door a predefined distance to increase the amount of residence time the ground coffee is retained in the chamber when the motor load is below the motor load operating range.

18. A method of claim 16, wherein the step of moving comprises the step of opening the discharge door a predefined distance to decrease the amount of residence time the ground coffee is retained in the chamber when the motor load is above the motor load operating range.

19. The method of claim 16, wherein the step of moving comprises the step of moving the discharge door when the motor load is outside the predefined motor load operating range to increase or decrease an amount of coffee chaff within the ground coffee exiting the chamber.

20. A method of densifying coffee, comprising the steps of:
grinding whole bean coffee into ground coffee in a coffee grinder driven by at least one grinder motor
feeding the ground coffee into an inlet of an elongated chamber, to form a bed of ground coffee in the chamber, the chamber comprising the inlet, a shaft, a discharge opening, a plurality of paddle-free pins fixed to the shaft, and a discharge door adjacent the discharge opening;
moving the ground coffee from a receiving portion of the chamber adjacent the inlet toward a densifier portion of the chamber comprising the plurality of paddle-free pins by rotating a spiral auger in the receiving portion, the spiral auger is fixed to the shaft;
rotating the plurality of paddle-free pins through the ground coffee within the densifier portion of the elongated chamber, a densifier motor driving the shaft and the plurality of paddle-free pins to rotate through the bed of ground coffee independent from the at least one grinder motor;
measuring, with a motor load sensor, a motor load on the densifier motor driving the plurality of paddle-free pins polishing the ground coffee in the chamber;
positioning the discharge door to a full closed position during densifier startup until the motor load reaches a predefined motor load operating range;
moving the discharge door, by providing a signal from a controller to a discharge door actuator connected, when the controller detects the motor load, reported by the motor load sensor, is outside the predefined motor load operating range to increase or decrease each of (a) a rate at which the ground coffee exits the chamber, (b) the motor load, (c) a density of the ground coffee exiting the chamber, (d) a resident time which the ground coffee is retained in the chamber before exiting, and (e) an amount of coffee chaff in the ground coffee exiting the chamber through the discharge opening;
positioning the discharge door in a full open position after a predetermined time period when no coffee grounds are being added to the chamber.

21. A method of densifying coffee, comprising the steps of:
feeding a ground coffee into an inlet of an elongated chamber from a coffee grinder driven by at least one grinder motor, to form a bed of ground coffee in the chamber, the chamber comprising the inlet, a shaft, a discharge opening, and a plurality of densifier members fixed to the shaft and projecting from the shaft;
polishing a plurality of coffee particles of the ground coffee within the elongated chamber by rotating the plurality of densifier members through the bed of ground coffee, a densifier motor driving the shaft and the plurality of densifier members to rotate through the bed of ground coffee independent from the at least one grinder motor;
measuring, with a motor load sensor, a motor load on the densifier motor driving the plurality of densifier members polishing the ground coffee in the chamber;
moving a discharge door, by providing a signal from a controller to a discharge door actuator, when the controller detects the motor load, reported by the motor load sensor, is outside a predefined motor load operating range to increase or decrease a density of the ground coffee exiting the chamber through the discharge opening.

22. The method of claim 21, comprising the step of moving ground coffee from a receiving portion of the chamber adjacent the inlet toward a densifier portion comprising the plurality of densifier members by rotating a spiral auger within the ground coffee in the receiving portion, the spiral auger is fixed to the shaft.

23. The method of claim 21, wherein the plurality of densifier members are a plurality of paddle-less pins, and wherein the step of polishing comprises rotating a four rows of the plurality of paddle-less pins through the bed of ground coffee where each of the four rows is spaced about a circumference of the shaft in ninety degree increments.

24. A method of claim 21, wherein the step of moving comprises the step of retracting the discharge door a predefined distance to increase the density of the ground coffee exiting the chamber when the motor load is below the motor load operating range.

25. A method of claim 21, wherein the step of moving comprises the step of opening the discharge door a predefined distance to decrease the density of the ground coffee exiting the chamber when the motor load is above the motor load operating range.

26. The method of claim 21, wherein the step of moving is further defined in that the motor load operating range is a motor load setpoint.

27. The method of claim 21, comprising the step of positioning the discharge door to a full closed position during a startup until the motor load reaches the motor load operating range.

28. The method of claim 21, comprising the step of positioning the discharge door in a full open position after a predetermined time period when no coffee grounds are being added to the chamber.

29. The method of claim 21, wherein the step of moving the discharge door is further defined in that the discharge door is moved to increase or decrease an amount of residence time the ground coffee is retained in the chamber.

30. A method of claim 29, wherein the step of moving comprises the step of retracting the discharge door a predefined distance to increase the amount of residence time the ground coffee is retained in the chamber when the motor load is below the motor load operating range.

31. A method of claim 29, wherein the step of moving comprises the step of opening the discharge door a predefined distance to decrease the amount of residence time the ground coffee is retained in the chamber when the motor load is above the motor load operating range.

32. The method of claim 29, wherein the step of moving comprises the step of moving the discharge door when the motor load is outside the predefined motor load operating range to increase or decrease an amount of coffee chaff within the ground coffee exiting the chamber.

33. The method of claim 21 wherein the step of moving is further defined in that the discharge door is moved to increase or decrease each of (a) a rate at which the ground coffee exits the chamber, (b) the motor load, (c) a resident time which the ground coffee is retained in the chamber before exiting, and (d) an amount of coffee chaff in the ground coffee exiting the chamber through the discharge opening.

* * * * *